Jan. 14, 1941. C. BROWN 2,228,591
FISH LURE
Filed April 6, 1939
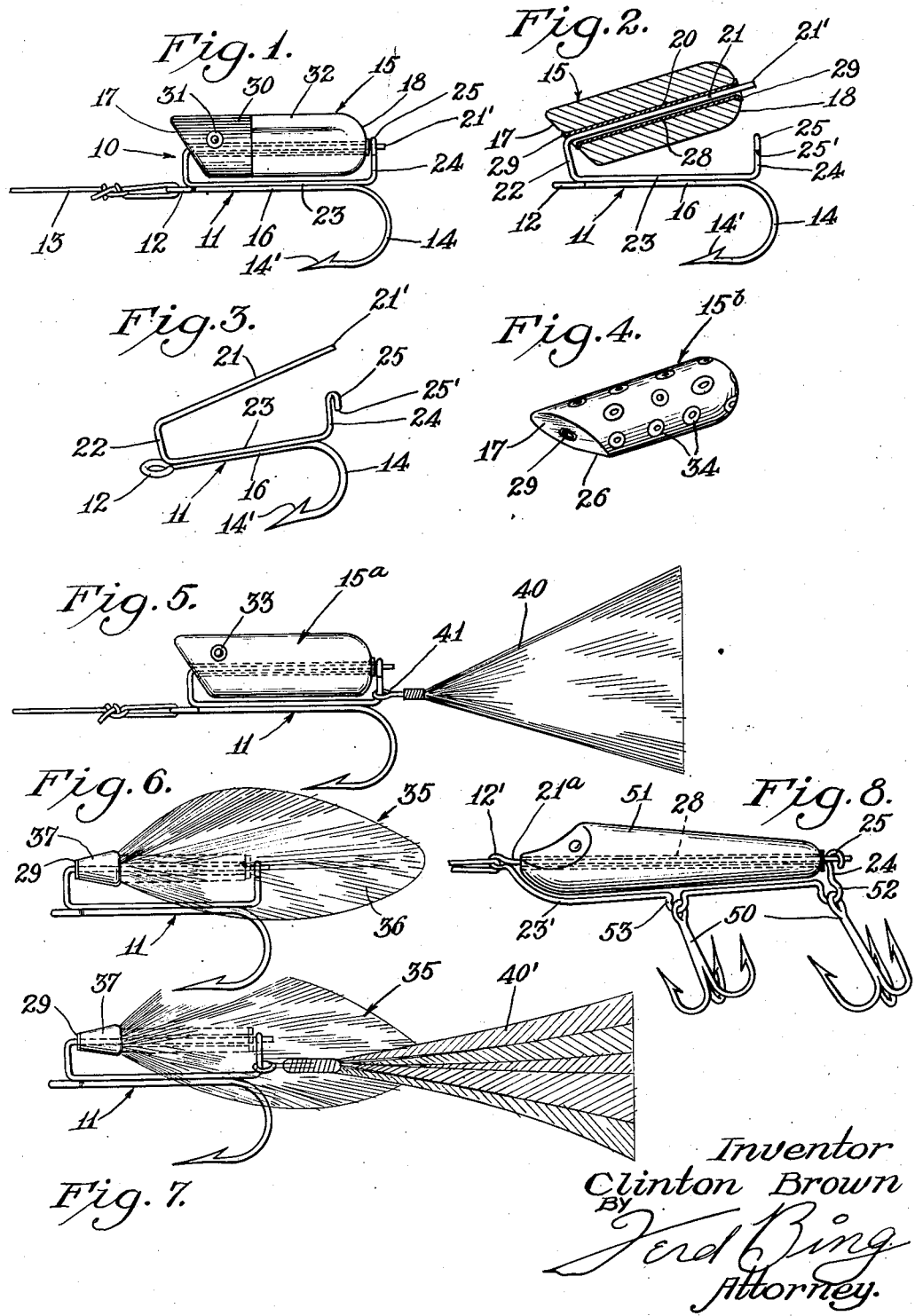
Inventor
Clinton Brown Patented Jan. 14, 1941

2,228,591

UNITED STATES PATENT OFFICE 2,228,591

FISH LURE

Clinton Brown, Oak Park, Ill., assignor to The South Bend Bait Company, South Bend, Ind., a corporation of Indiana Application April 6, 1939, Serial No. 266,351

8 Claims. (Cl. 43—42)

The invention relates generally to fish lures.

It is well known that in fishing it is usually necessary or desirable to change the type or design of lure being used quite often in order to determine which lure is most effective, and in effecting such substitution of conventional lures it is necessary to detach the lure from the line or leader, and to thread the line or leader through the eye of the new lure so as to fix the new lure to the line. This operation requires considerable time and persistence, and is exceptionally difficult because of light conditions during periods of dawn or dusk fishing, during which periods loss of fishing time is particularly objectionable.

The primary object of the present invention is to conserve the actual available fishing time through the provision of a novel fish lure the effective character and appearance of which may be readily and quickly changed without the objectionable and time consuming detachment and re-attachment of the line or leader with relation to the attachment eye of the lure.

A further object of the present invention is to provide a new and improved fish lure wherein the same hook and its line attachment means may be readily and easily associated with any selected one of a wide variety of differently formed and differently appearing lure bodies, thereby to enable the fisherman to produce a wide selection of complete lures according to his own ideas on the subject, and also enabling the fisherman to pack and transport this wide available selection within a limited or compact space in his carrying case.

A further object is to provide a new and improved fish lure in which the user may modify the effective length or the effective positioning of the hook, as well as the overall appearance of the lure through the use of any selected one of a wide variety of tails or streamers which are readily and easily associated with the hook of the lure.

Other objects and advantages will become apparent from the following description, taken in connection with the accompanying drawing, in which:

Fig. 1 is a side elevational view illustrating a fish lure embodying the features of the invention.

Fig. 2 is a view taken partially in longitudinal central section, showing the fish lure of Fig. 1 with the lure body released and ready for removal and substitution of a differently appearing or a differently constructed lure body.

Fig. 3 is a perspective view of the chassis of the present fish lure.

Fig. 4 is a perspective view of a differently decorated lure body of the general type shown in Figs. 1 and 2.

Fig. 5 is a view similar to Fig. 1 showing the fish lure modified in its general appearance as well as in effective length through the use of still another decorative pattern on a lure body of the bug-type shown in Fig. 1, and through the incorporation of a tail or streamer which may be of any one of a wide variety of colors and sizes.

Fig. 6 is a view of the lure showing the incorporation of a lure body of the wet-fly type.

Fig. 7 is a view of the lure with lure body similar to that used in Fig. 6 and incorporating a streamer or tail which in the form shown is made from feathers.

Fig. 8 is a side elevational view showing an alternative embodiment of the invention wherein the hook or hooks are replaceably associated with the chassis, this embodiment being particularly adapted for casting or trolling baits of various larger sizes.

For purposes of disclosure two major forms of the invention are illustrated in the drawing, together with several varieties and arrangements of lure bodies, and these forms and arrangements of lure bodies will be described in detail as applied to particular forms of chassis or carrying means, but it is to be understood that this disclosure is not intended as a limitation of the invention to the forms shown or to the particular types of material used, it being contemplated that various changes might be made by those skilled in the art to adapt the invention to other types of lures and lure bodies or lure chassis, or to other types and forms of materials, without departing from the spirit and scope of the invention as defined in the appended claims.

In attaining the foregoing, and other objects, I provide a fish lure which comprises a chassis embodying line attachment means adapted to remain in continuous association with the line or leader, there being a suitable fish hook associated with the chassis either permanently or replaceably, and there being provided a correlated series of lure bodies of different and varying physical construction and appearance, which may be of the same or of different species, adapted to be mounted selectively on the chassis through the use of complementary attaching means on the lure bodies and the chassis.

In the form illustrated in Fig. 1 the invention is embodied in a lure 10 comprising an elongated chassis 11 with a line attachment eyelet 12 at one end to receive a line or leader 13, a fish hook 14 operatively associated therewith adjacent its other end, and a lure body 15 detachably mounted on one side of the chassis between the line attachment eyelet and the hook. The present invention contemplates and provides for changing the characteristics and visual appearance of the lure 10 while the chassis 11 (including the eyelet 12 and the hook 14) remain in permanent association with the line 13, this end being attained by detaching the lure body 15 from the chassis and substituting a differently constructed or differently decorated lure body on the chassis. The eyelet 12 and the hook 14 may therefore be integral, and in the present instance a standard hook has been employed, with the usual integral shank 16 between the hook 14 and the line attachment eyelet, so that in the present case, the shank 16 serves as a part of the chassis 11.

The present invention is applicable to lures of many kinds, such as trout, bass, and salmon flies or bugs, for either underwater or surface fishing, as well as to trolling and casting baits made from wood, cork, metal, plastics, feathers, silk or other materials, or made from combinations of such materials; and in each instance the appearance of the lure may be quickly changed through substitution of different lure bodies of the same general type, or by substitution of different types. Thus, as shown in Figs. 1 to 7, the present invention provides for quickly changing the lure body from the bug-type floating bait of Figs. 1, 2 and 5 to the underwater fly type shown in Figs. 6 and 7; or for substituting a succession of differently decorated lure bodies of either one of these general types.

As shown in Figs. 1 and 2, the lure 10 has a lure body 15 of the bug or floating type which may be made of a material such as wood, the embodiment shown being of an elongated generally cylindrical form having its forward end 17 cut at an angle to the longitudinal axis as is customary with baits of this general character, and having its rear end rounded as at 18.

To provide for readily removing the lure body 15 and replacing it with a differently formed or differently decorated lure body, complemental attachment or mounting means is provided, partly on the chassis 11 and partly on the lure body 15; and, in the preferred form herein illustrated, the portion of this mounting and positioning means which is formed on the lure body 15 comprises a longitudinal bore 20 (Fig. 2) adapted to receive a straight mounting bar 21, which bar 21 extends through the bore 20 and comprises a part of the attachment means of the chassis 11.

Preferably the mounting bar 21 is formed from resilient wire of slightly smaller diameter than the wire from which the hook 14 is made, and is of sufficient length to extend entirely through the bore 20 with a free end 21' extending beyond the rear end of the lure body 15. At the other or front end of the lure body 15 the wire is bent at right angles to the mounting bar 21 to form a supporting arm 22 which extends to the shank 16 adjacent to the eyelet 12. At this point the wire is bent so as to extend rearwardly along the shank 16 to provide a base wire 23 which is secured permanently to the shank 16 as by means of soldering or welding.

At a point just beyond the rear end of the lure body 15 the wire of the base 23 is bent away from the hook 14 to form an arm 24 extending past the Fig. 1 position of the mounting bar 21, and is reversely bent as at 25 to form a hook-like keeper with which the free end 21' of the mounting bar 21 may be engaged. As shown in Figs. 1 and 2, the arms 22 and 24 are located in substantially the same plane as the hook 14 so that the lure body 15 is positioned in a remote relation to the barbed point 14' of the hook. The length of the lure body 15 at the axis of the bore 20 is so proportioned as to allow but slight longitudinal movement between the arms 22 and 24, while the bore 20 is so related to the exterior surface of the lure body as to prevent excess rotative movement of the lure body about the axis of the mounting bar 21. In the present case the lure body 15 has a flattened lower face 26 (Fig. 4) and the bore 20 is so related to this surface that the edges of this surface 26 will strike the base 23 and thereby limit to a degree the rotative movement of the lure body.

This limited rocking movement of the lure body 15 has been found to be of marked importance in assuring variable and natural darting of the lure back and forth across the general line of retrieving movement, and in attaining this action the variable positioning of the angular surface 17 by such rocking movement plays an important part.

Since the lure body 15 is, in the form shown, made from wood, the bore 20 is preferably provided with a rigid liner such as a metallic sleeve 28 which serves to prevent closure of the bore 20 when the wood swells due to water soaking. The sleeve 28 also provides a smooth inner surface for the bore 20 and thereby facilitates mounting of the lure body on the mounting bar 21. Preferably the sleeve 28 is held in place by outwardly flanging its ends as at 29, and this flanging also serves to provide tapered entrances to the sleeve 28 and thereby facilitate the insertion of the bar 21 into the bore 20. The mounting operation is accomplished while the mounting bar is in the released position of Figs. 2 and 3, the arm 22 being arranged normally to urge the mounting bar to this position; and after the lure body is in position as shown in Fig. 2, the bar 21 is sprung toward the shank 16 and the free end 21' is engaged with the hoop or keeper 25. The body 15 is, of course, proportioned to permit the free end 21' to be moved downwardly about the end 25' of the hook 25.

In the form shown in Fig. 1, the lure body 15 is decorated in a conventionalized manner to represent a fish, the forward end or section 30 being decorated in one color such as red, with a black and white eye 31, while the rear or body portion 32 is decorated in a different solid color such as white. In practice several interchangeable and differently decorated lure bodies of the bug-type are provided, several of which may be of different solid colors such as silver, green, yellow or black, as shown in the single-color decoration of the bug-type lure body 15a in Fig. 5, and this form, the representation of eyes, as at 33, may be employed, if desired. Other variations of color scheme may be employed in the bug-type lure body, as shown in the lure body 15b of Fig. 4, which is painted green with yellow and black spots 34 so as to constitute a conventionalized representation of a frog.

To provide for quickly changing from the floating lure of Figs. 1 to 5, to produce a lure having radically different characteristics, the present invention provides a fly-type lure body 35 as shown in Figs. 6 and 7 which may be mounted on the chassis 11 in the same manner as the lure bodies of the bug-type, and interchangeably therewith. As shown in Figs. 6 and 7, the lure body 35 is formed with a mounting sleeve such as the sleeve 28 of Fig. 2 as a base or supporting element, and the hairs or feathers 36 from which the fly is made are wound upon or secured to the sleeve in a conventional manner as indicated by the shellacked cord binding 37. In this construction the end flanges 29 of the sleeve 28 serve to hold the winding in the proper position on the sleeve. The sleeve 28 is, of course, of such a length that it may move but slightly between the arms 22 and 24 of the chassis 11, so that the lure body 35 is effectually maintained in the desired relation to the hook 14. In practice, several fly-type lures 35 are provided, preferably in well-known combinations of colors and materials, so that the user may, by substituting different designs of fly-type lure bodies, easily arrive at the most effective lure.

Further variation of the appearance of the lure is attained through the provision of a plurality of trailers or tails 40 and 40' which may be made of various materials such as hair, shown in Fig. 5, or feathers as shown in Fig. 7. In either case, the material of the trailer is conventionally attached, as by winding, to an attachment eyelet 41, and where the keeper 25 is formed from wire as herein taught, the eyelet 41 may be placed over the hook 25 and onto the arm 24 so as to trail behind the main lure body 15 or 35, and thereby increase the effective length of the lure. When the trailer is so positioned engagement of the bar 21 with the keeper 25 serves to lock the trailer 40 in position on the chassis. The attachment of a trailer 40 to the chassis constitutes an effective means to compensate for any tendency of the fish to strike forwardly of the hook 14.

The trailers 40 and 40' may, of course, be made in a wide variety of colors and combinations of colors, so that by inter-change of trailers 40, and lure bodies 15 or 35, the fisherman may attain an exceedingly large number of different combinations of color and form in the present lure; and all of the various combinations may be readily attained while the hook and the chassis remain undisturbed in their usual fixed relation to the line or leader. The materials requisite to this wide variety of different effective lures are such that they may be packed and carried in a relatively small space, so as to be marked improvement in this respect, while the operation of changing lures is by the present invention so simplified as to conserve materially the available fishing time.

In Fig. 8 of the drawing there is illustrated an alternative construction adapted particularly for use in trolling or casting baits, and in this embodiment the invention provides for separable or replaceable mounting on the chassis of one or more hooks such as the gang hooks 50. In this form the mounting bar 21a has a line attachment eyelet 12' formed at its forward end, while the base wire 23' extends downwardly and rearwardly from the eyelet 12' beneath the lower surface of a lure body 51. At its rear end the base wire 23' is bent upwardly to form a hook-like keeper 25 to receive the free end of the mounting bar 21a in the same manner as in the Fig. 1 construction. At the juncture of the base wire 23' and the arm 24, an outward U-shaped attachment or positioning element 52 is formed so that the eyelet of a hook 50 threaded over the keeper 25 may be positioned in the U-shaped projection 52. A similar U-shaped positioning element 53 may be formed intermediate the length of the base wire 23' to receive and position a second hook 50. With this construction the bottom of the lure body 51 serves to hold the hooks 50 in position in the U-shaped elements 52 and 53.

With the embodiment of Fig. 8, several interchangeable lure bodies 51 are provided, and these bodies may differ somewhat in form as well as in color or combinations of color, so that by convenient and rapid removal and replacement of lure bodies, the fisherman may effectually change the appearance of his lure without the trouble and loss of time usually involved in detaching and re-attaching his line. Moreover, the form shown in Fig. 8 permits rapid modification of the type, size and arrangement of hooks; and is such as to permit interchangeable use of trailers such as the trailers 40 and 40' for further modification and variation of the overall appearance of the lure.

I claim as my invention:

1. A fishing device comprising, in combination, an elongated chassis having line attachment eyelet operatively associated therewith adjacent one end, a hook operatively associated with said chassis adjacent the other end, a resilient wire member extending away from said chassis adjacent said line attachment eyelet and then having its free end extending generally parallel to said chassis toward the other end of the chassis to form a mounting bar, a hook-like keeper extending from said chassis adjacent said other end thereof for engagement by said free end of said mounting bar, and a lure body having a longitudinal opening therethrough mounted on said mounting bar with said mounting bar extending through said longitudinal opening, and held removably in place on said chassis by engagement of the free end of said mounting bar with said hook-like keeper.

2. A fishing device as defined in claim 1 wherein said hook-like keeper is made from wire, and wherein a tail element having an attachment eyelet is removably attached to said chassis by threading the attachment eyelet of said tail element over the wire keeper and is removably held in place thereon by engagement of the free end of said mounting bar with said keeper.

3. A fishing device comprising, in combination, a chassis member having line attachment means operatively associated with one end thereof, a hook operatively associated with the other end thereof, an elongated lure body member, and manually operable means for removably securing said lure body member on said chassis member, said members being formed to cooperate in maintaining said lure body member within a predetermined range of a predetermined rotative relation to said chassis member while permitting a slight rocking movement of the body member relative to the chassis member.

4. A fishing device as defined in claim 3 wherein said body member has an angularly formed forward end face.

5. A fishing device comprising a chassis formed from resilient wire to provide a line attachment eyelet and having said wire extending in spaced generally parallel relation to provide a space for receiving a lure body between the two generally parallel portions, one of said two portions being relatively straight to provide a mounting bar, and the other one of said portions having U-shaped outwardly projecting positioning elements formed therein to receive and position a fish hook the eyelet of which is slipped over the free end of said other portion, a lure body having mounting and positioning means slipped over the free end of said mounting bar, and means for forming a quick detachable connection between the free ends of said generally parallel portions to retain said lure body and said hook in position on said chassis.

6. A fishing device comprising a chassis formed from resilient wire to provide a line attachment eyelet and having said wire extending in spaced generally parallel relation to provide a space for receiving a lure body between the two parallel portions, one of said two portions being relatively straight to form a resilient mounting bar, and the other having a laterally bent hook portion forming a keeper into which the free end of said mounting bar may be hooked to form a closed loop, the said other one of said portions having a U-shaped positioning element formed therein projecting away from said plug receiving space to receive and position a fish hook the eyelet of which is slipped over said laterally bent hook portion and along said other one of said portions into said U-shaped positioning element.

7. A fishing device as defined in claim 6 having a plug-like lure body with a longitudinal passage formed therethrough, said body having said mounting bar extending through said passage, and being held in place by engagement of said mounting bar with said keeper, said body being proportioned to prevent displacement of the eyelet of said hook from said positioning element.

8. A fishing devices comprising, in combination, an elongated chassis having line attachment eyelet means and a hook operatively associated therewith adjacent opposite ends of the chassis, a resilient wire member extending away from said chassis adjacent one end and then having its free end extending generally parallel to said chassis toward the other end of the chassis to form a mounting bar, a hook-like keeper extending from said chassis adjacent said other end thereof for engagement by said free end of said mounting bar, and a lure body having a longitudinal opening therethrough mounted on said mounting bar and with said mounting bar extending through said longitudinal opening, and held removably in place on said chassis by engagement of the free end of said mounting bar with said hook-like keeper.

CLINTON BROWN.